United States Patent
De Leeuw et al.

(10) Patent No.: US 7,636,661 B2
(45) Date of Patent: Dec. 22, 2009

(54) MICROPHONE INITIALIZATION ENHANCEMENT FOR SPEECH RECOGNITION

(75) Inventors: Adam Pieter De Leeuw, Southampton (GB); Steven Groeger, Poole (GB); Stuart John Hayton, Waterlooville (GB)

(73) Assignee: Nuance Communications, Inc., Burlington, MA (US)

( * ) Notice: Subject to any disclaimer, the term of this patent is extended or adjusted under 35 U.S.C. 154(b) by 903 days.

(21) Appl. No.: 11/172,045

(22) Filed: Jun. 30, 2005

(65) Prior Publication Data

US 2006/0004573 A1 Jan. 5, 2006

(30) Foreign Application Priority Data

Jul. 1, 2004 (GB) ................... 0414711.2

(51) Int. Cl.
*G10L 15/04* (2006.01)
(52) U.S. Cl. .............. 704/251; 704/254; 704/247; 704/231
(58) Field of Classification Search ........... 704/251, 704/247, 254, 231
See application file for complete search history.

(56) References Cited

U.S. PATENT DOCUMENTS 5,386,494 A * 1/1995 White .............. 704/270.1
6,374,226 B1 * 4/2002 Hunt et al. ............ 704/275
6,594,629 B1 * 7/2003 Basu et al. ............ 704/251
2001/0012996 A1 * 8/2001 Bartosik ................ 704/233
2002/0055844 A1 * 5/2002 L'Esperance et al. ....... 704/260

* cited by examiner

*Primary Examiner*—Qi Han
(74) *Attorney, Agent, or Firm*—Wolf, Greenfield & Sacks, P.C.

(57) ABSTRACT

A method and arrangement for improved speech recognition in a telephonically challenging speakerphone in-car environment. The method includes receiving a signal from a microphone representative of speech to be recognized, performing detection of a transition in the signal indicative of switch on of the microphone, and, in response to the detection, performing speech recognition on the signal with reduced contribution from an initial portion thereof. The initial portion may be treated as optional speech, the speech recognition may be performed with a predetermined redundant sound, and a user may be requested to speak the predetermined redundant sound when speech recognition has fallen below a predetermined threshold. Thus, recognition may be made possible when otherwise it would not be possible, recognition match scoring will be increased as the low weighting given by deleted initial sounds will be eliminated and therefore confusion of the recognized phrase will be reduced.

10 Claims, 4 Drawing Sheets

FIG. 1 - Prior Art

MICROPHONE INITIALIZATION ENHANCEMENT FOR SPEECH RECOGNITION

CROSS-REFERENCE TO RELATED APPLICATIONS

This application claims the benefit of United Kingdom Patent Application No. 0414711.2 filed Jul. 1, 2004.

FIELD OF THE INVENTION

This invention relates to speech recognition, and more particularly to a microphone initialization enhancement for automated speech recognition systems.

BACKGROUND OF THE INVENTION

In the field of this invention it is known that many speaker phones and mobile phone car installations suppress the microphone while sound is being played out in order to eliminate echo and feedback. According to conventional teachings, the microphone remains in an off state until a relatively high volume audio signal is received. This microphone enablement technique causes the microphone to remain in an off state when a user speaks in a low to medium volume. Because the speaker phone or mobile kit does not react until after a high energy audio signal is received, any low level sounds at the start of the utterance can be lost. Accordingly, the system only receives a truncated part of the utterance resulting in a speech recognition of the utterance being unsuccessful.

This approach has the disadvantage that the spoken phrase is highly likely to be rejected outright or possibly confused with other candidate phrases. A need therefore exists for method of increasing speech recognition performance in such systems wherein the abovementioned disadvantage(s) may be alleviated.

SUMMARY OF THE INVENTION

In accordance with a first aspect of the present invention there is provided a method of speech recognition for use with a system having a microphone. The method includes receiving a signal from the microphone representative of speech to be recognized, performing detection of a transition in the signal indicative of switch on of the microphone, and, in response to the detection, performing speech recognition on the signal with reduced contribution from an initial portion thereof.

In accordance with a second aspect of the present invention there is provided a speech recognition system for use with a system having a microphone. The system includes means for receiving a signal from the microphone representative of speech to be recognized, means for performing detection of a transition in the signal indicative of switch on of the microphone, and means for performing, in response to the detection, speech recognition on the signal with reduced contribution from an initial portion thereof.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

One method of improved speech recognition with speaker phones and car kits incorporating the present invention will now be described, by way of example only, with reference to the accompanying drawings, in which.

DESCRIPTION OF PREFERRED EMBODIMENTS

Figure 1:
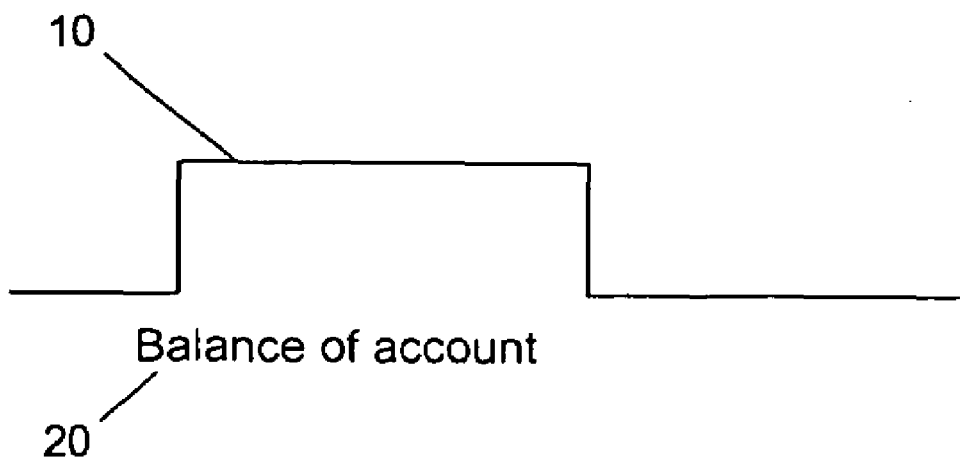
FIG. 1 shows a schematic illustration of a prior art speakerphone speech recognition system.

Referring firstly to FIG. 1, in a known speech recognition system (not shown), the system receives a waveform 10 resulting from speaking of the words "Balance of account" 20. Because, as discussed above, the system microphone (not shown) is typically suppressed while sound is being played out in order to eliminate echo and feedback, the system does not react until after a high energy audio signal is received; therefore, sounds at the beginning of the utterance are lost. Thus, the recognition system hears "lance of account" which does not contain all of the sounds expected to be heard in "Balance of account". Typically, such a speech recognition system is looking for a specific sequence of sounds and will either not match the expected phrase or will score the match with a low probability.

Figure 2:
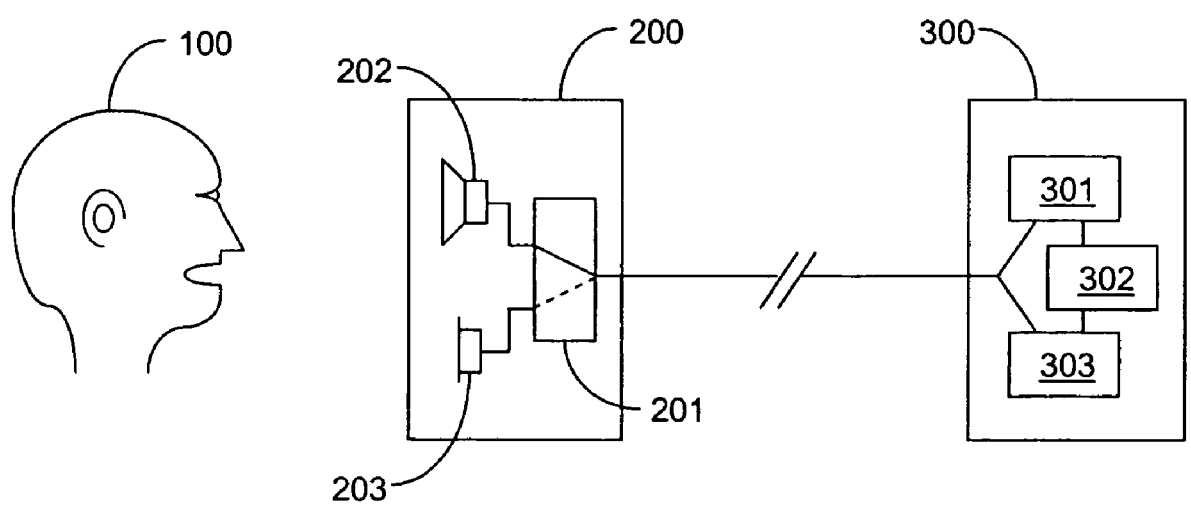
FIG. 2 shows a block schematic diagram depicting a speakerphone speech recognition system incorporating the present invention.

Referring now to FIG. 2, a telephone based automated speech recognition system for use by a user 100 in challenging telephony environments (such as in-car) includes a speakerphone arrangement 200 having a controller 201 which controls operation of a speaker 202 and microphone 203. A speech recognition arrangement 300 is coupled to the speakerphone arrangement 200 and has a speech detector 301, a speech recognition controller 302 and a speech recognition engine 303.

The speech detector 301 serves to automatically detect and enable the following mode of operation: the speech detector 301 identifies if the profile of the audio energy received from the speakerphone arrangement 200 is silence or close to silence followed by a high energy edge (rapid transition caused by the microphone 203 switching on); then, this situation will be notified by the speech recognition controller 302 to the speech recognition engine 303.

The speech recognition engine 303 will process the utterance but will, in light of the signal from the speech detector 301, automatically modify its behavior to not expect to match the initial sounds of the utterance. In effect, the initial sounds will become an optional part of the utterance.

Another example is to say that the recognition engine will accept deletions of sounds at the start of the utterance. Exactly how much (time) of the utterance might be allowed to be missing may be established by tuning the system for optimum recognition.

Alternatively, the grammars and call flows of the speech recognition engine may be constructed to optionally accept a redundant word (such as "please") at the start of every utterance. This word is defined with special purpose "sound sequences" for this method which allow all possible tail ends of the utterance to match.

When the system detects repeated failures, it suggests to the user that they use the "microphone enabling" word which has the effect that the first thing the user says to interrupt the system is not required to match.

Good recognition can proceed with the significant portion of the grammar after this redundant word.

Figure 3:
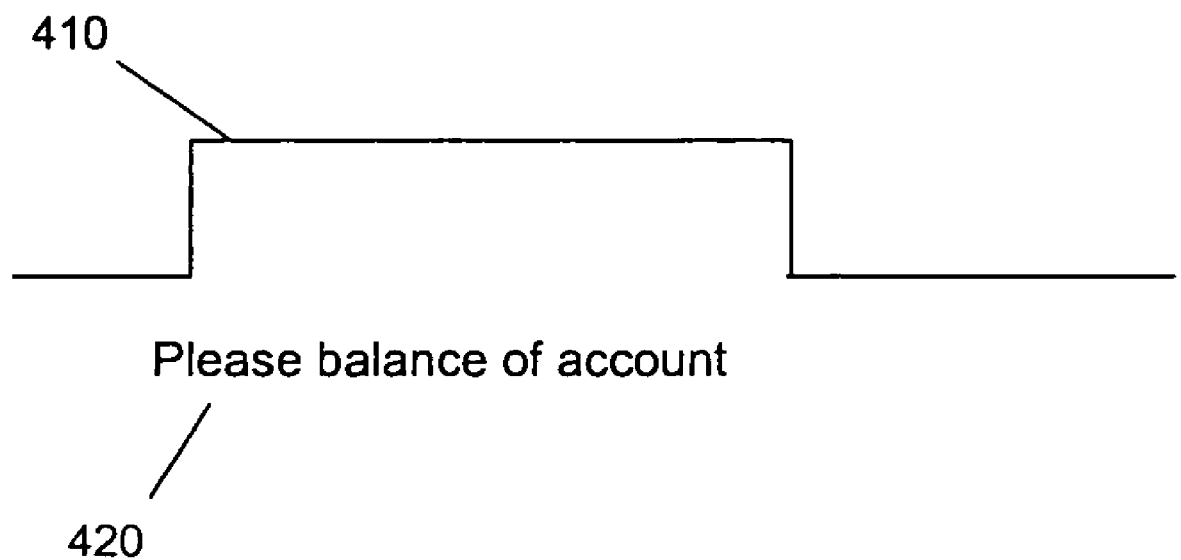
FIG. 3 shows a schematic illustration of a speakerphone speech recognition system.

The core of this alternative mode of operation is illustrated with reference to FIG. 3. As shown in FIG. 3, the speech recognition arrangement 300 receives a waveform 410 resulting from speaking of the words "Please balance of account". Because, as discussed above, the microphone 203 is typically suppressed while sound is being played out in order to eliminate echo and feedback, the system does not react until a high energy audio signal is received. Thus, the recognition system receives "ease balance of account", but it is expecting phrases such as:

"Please balance of account" or
"lease balance of account" or
"ease balance of account"—(Match) or
"se balance of account" or
"balance of account"

Therefore the desired phrase is successfully recognised.

Figure 4:
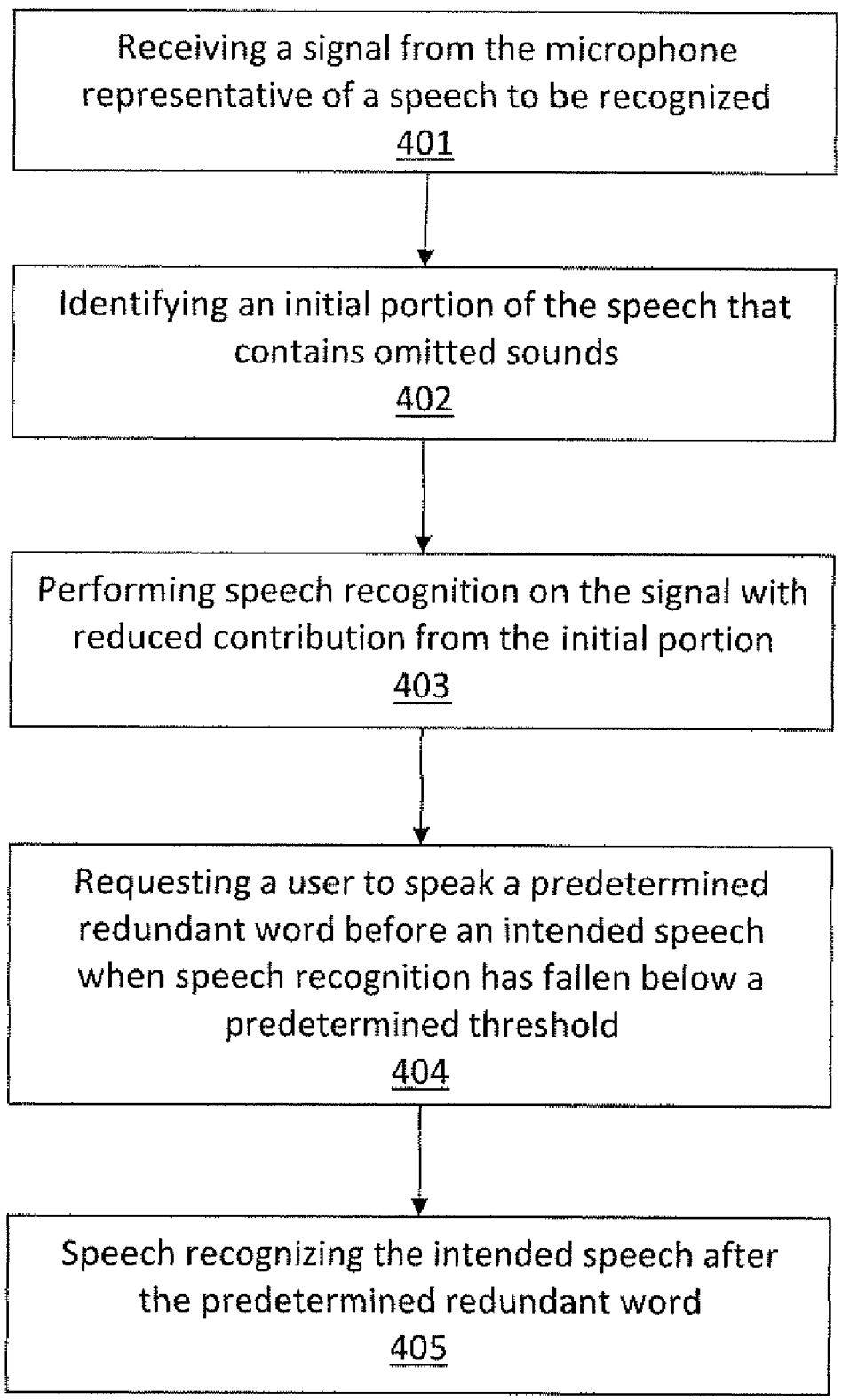
FIG. 4 is a flow chart illustrating the steps of a method according to an embodiment of the present invention.

FIG. 4 shows the steps of a method of speech recognition for use with a system having a microphone according to the present invention. At step 401, a signal representative of a speech to be recognized is received from the microphone which was turned off before receiving the signal. At step 402, an initial portion of the speech is identified. The initial portion contains omitted sounds. At step 403, speech recognition is performed on the signal with reduced contribution from the initial portion of the speech. A quantity by which the contribution of the initial portion is reduced is a configurable parameter. When speech recognition has fallen below a predetermined threshold, at step 404, a user is requested to speak a predetermined redundant word before an intended speech. The predetermined redundant word turns on the microphone and is user configurable. At step 405, the intended speech after the predetermined redundant word is speech recognized.

It will be understood that this method can be implemented without modification to speech recognition system software, only the speech recognition controller being new in this alternative.

It will be understood that in this alternative, the special word ("please" in the above example) can be redefined to match alternate "baseform" sequences (as known in WVS—WebSphere™ Voice Server—terminology) which, in this case, are the various truncated endings of the sound. The special word will not be usable in other grammars where it is not permissible to accept truncated utterances.

It will be understood that the above-described preferred embodiment's method of increasing speech recognition performance with speaker phones and car kits provides the following advantages.

While the reliability of recognition may be reduced when compared with a good (microphone unsuppressed or full duplex) telephony situation, especially with short utterances, recognition will be made possible when it is often impossible without this method.

Recognition match scoring will be increased as the low weighting given by deleted initial sounds will be eliminated and therefore confusion of the recognized phrase will be reduced.

The method described with reference to FIG. 3 has the advantage that no modifications are required to the system software but requires the cooperation of the user and may be most appropriate to expert and high value systems where the user has a lot to gain by making the system work for themselves.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A method of speech recognition for use with a system having a microphone, comprising:
   receiving a signal from the microphone representative of a speech to be recognized, wherein the microphone was turned off before receiving the signal;
   identifying an initial portion of the speech that contains omitted sounds;
   performing speech recognition on the signal with reduced contribution from the initial portion of the speech, wherein a quantity by which the contribution of the initial portion is reduced is a configurable parameter;
   when speech recognition has fallen below a predetermined threshold, requesting a user to speak a predetermined redundant word before an intended speech, wherein the predetermined redundant word turns on the microphone and is user configurable; and
   speech recognizing the intended speech after the predetermined redundant word.

2. The method of claim 1, wherein the initial portion comprises at least one of a first word and a received and terminal portion of the first word of a spoken series of words contained within the signal.

3. The method of claim 2, further comprising the step of:
   establishing an utterance initiating word, wherein the first word is the utterance initiating word.

4. The method of claim 1, wherein the system is a telephone speaker phone system.

5. The method of claim 4, wherein the system is an in-car system.

6. A speech recognition arrangement for use with a system having a microphone, comprising:

means for receiving a signal from the microphone representative of a speech to be recognized, wherein the microphone was turned off before receiving the signal;

means for identifying an initial portion of the speech that contains omitted sounds;

means for performing speech recognition on the signal with reduced contribution from the initial portion of the speech, wherein a quantity by which the contribution of the initial portion is reduced is a configurable parameter;

means for, when speech recognition has fallen below a predetermined threshold, requesting a user to speak a predetermined redundant word before an intended speech, wherein the predetermined redundant word turns on the microphone and is user configurable; and means for speech recognizing the intended speech after the predetermined redundant word.

7. The arrangement of claim 6, wherein the initial portion comprises at least one of a first word and a received and terminal portion of the first word of a spoken series of words contained within the signal.

8. The arrangement of claim 7, further comprising:

means for establishing an utterance initiating word, wherein the first word is the utterance initiating word.

9. The arrangement of claim 6, wherein the system is a telephone speaker phone system.

10. The arrangement of claim 9, wherein the system is an in-car system.

* * * * *

UNITED STATES PATENT AND TRADEMARK OFFICE
CERTIFICATE OF CORRECTION

PATENT NO. : 7,636,661 B2
APPLICATION NO. : 11/172045
DATED : December 22, 2009
INVENTOR(S) : De Leeuw et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1210 days.

Signed and Sealed this

Ninth Day of November, 2010

David J. Kappos
*Director of the United States Patent and Trademark Office*